UNITED STATES PATENT OFFICE.

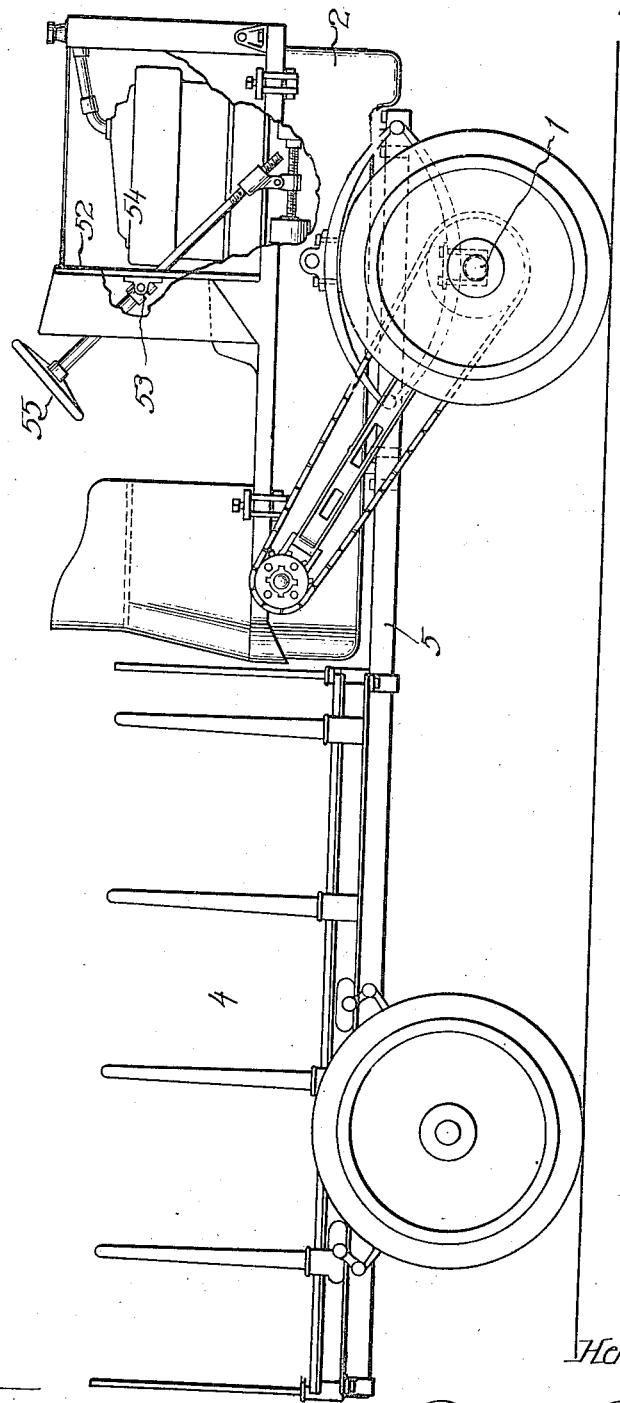

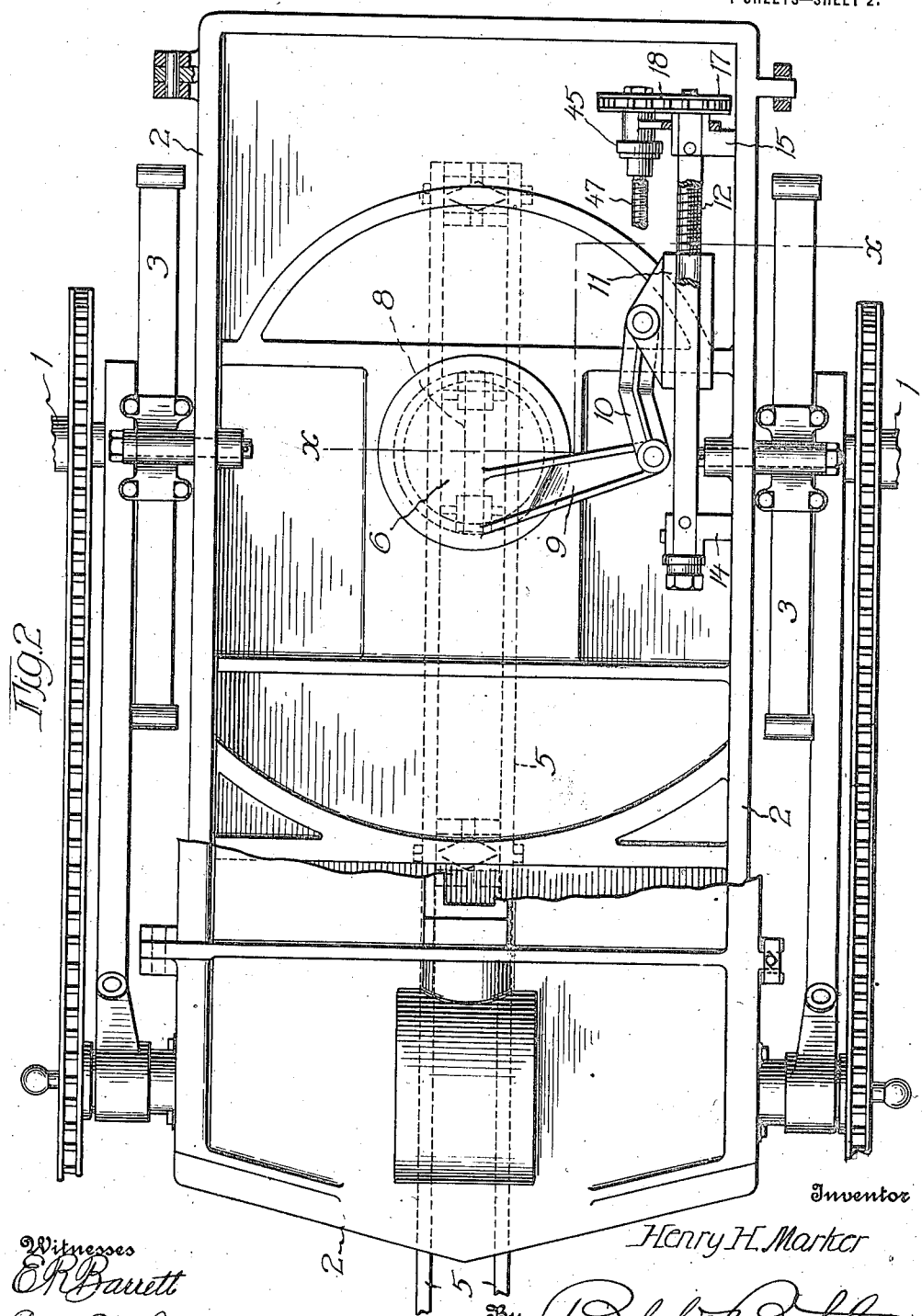

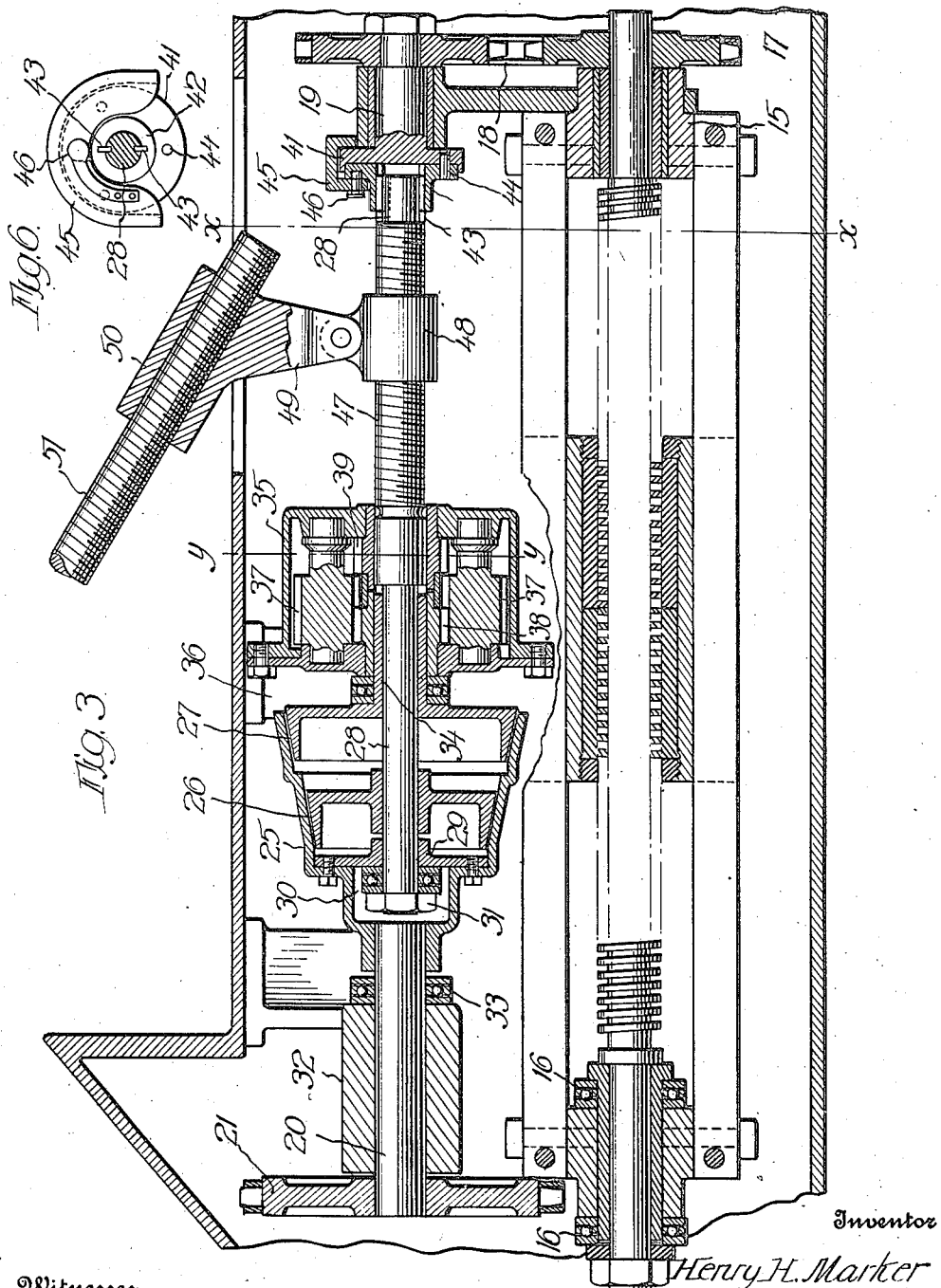

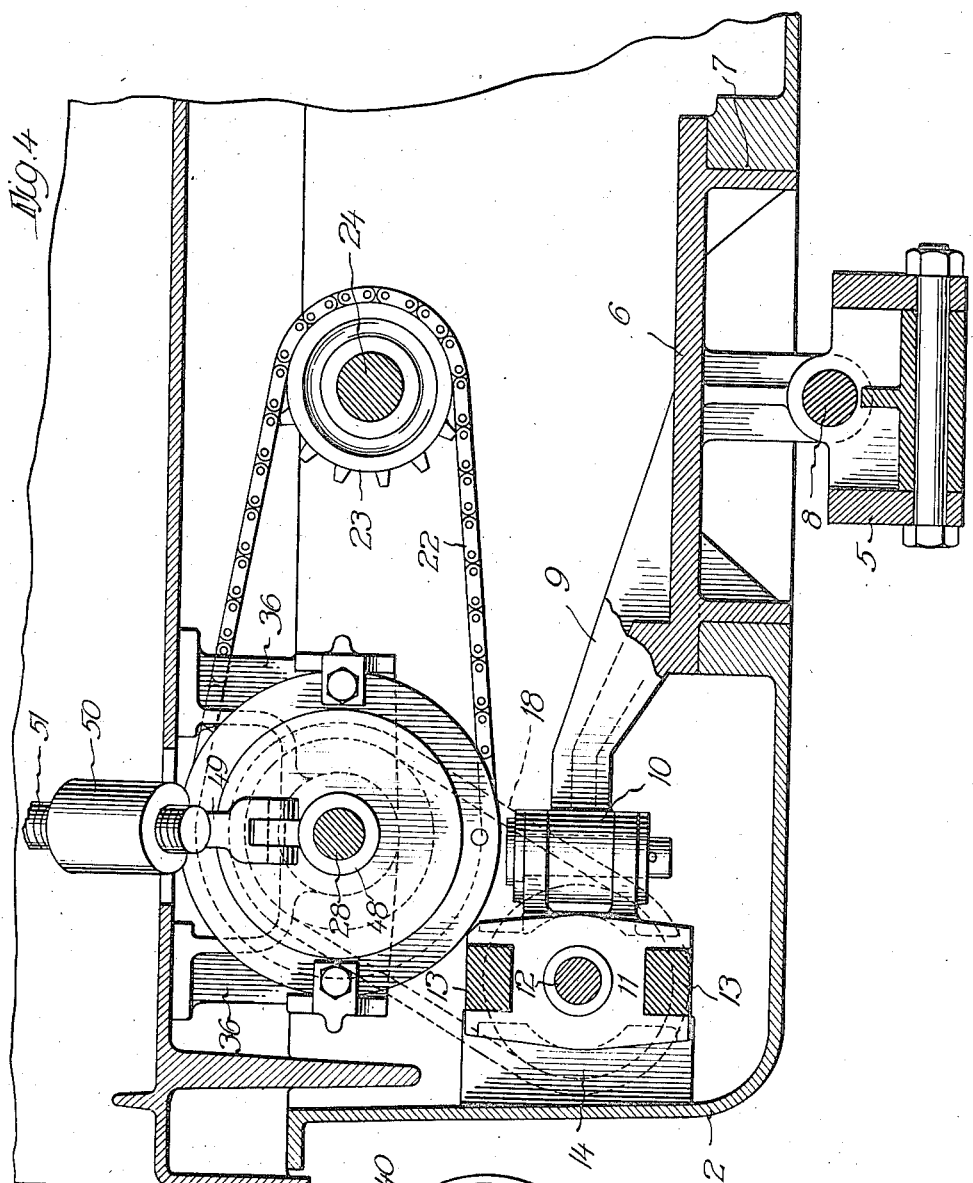
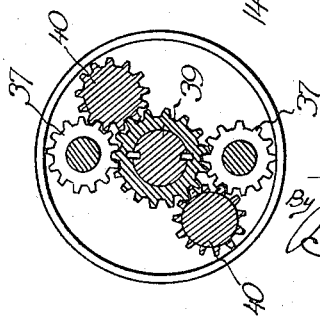

HENRY H. MARKER, OF MOUNT CLEMENS, MICHIGAN, ASSIGNOR TO PULL-MORE MOTOR TRUCK COMPANY, OF DETROIT, MICHIGAN, A CORPORATION OF MAINE.

MOTOR-ACTUATED STEERING MECHANISM.

1,172,152.  Specification of Letters Patent.  Patented Feb. 15, 1916.

Application filed April 4, 1914. Serial No. 829,429.

*To all whom it may concern:*

Be it known that I, HENRY H. MARKER, a citizen of the United States of America, residing at Mount Clemens, in the county of Macomb and State of Michigan, have invented certain new and useful Improvements in Motor-Actuated Steering Mechanism, of which the following is a specification, reference being had therein to the accompanying drawings.

This invention relates to power actuated steering mechanisms for motor driven conveyances and its object is to provide a simple and efficient construction, arrangement and combination of parts having certain new and useful features, all as hereinafter more fully described; and with these and other ends in view the invention consists in the matters hereinafter set forth and more particularly pointed out in the appended claims reference being had to the accompanying drawings in which—

Figure 1 is a side elevation of a motor vehicle to which the steering mechanism embodying the invention is applied; Fig. 2 is a plan view of a portion of the vehicle with parts broken away to disclose a portion of the steering mechanism shown in plan view; Fig. 3 is an enlarged longitudinal vertical section through a portion of the vehicle showing the steering mechanism in section; Fig. 4 is a transverse section substantially upon the lines X—X of Figs. 2 and 3; Fig. 5 is a section on the line $y$—$y$ of Fig. 3 of a reversing gearing; and Fig. 6 is a detail showing a shaft coupling in elevation.

While the invention is shown as applied to a motor vehicle or tractor of peculiar construction and design, it will be understood that said mechanism may be applied as well to other forms of motor vehicles or to any other form of conveyances which is directed in its movements by steering means carried thereby.

In Fig. 1 of the drawings, 1 indicates the front axle of the vehicle upon which a suitable body 2 is supported by springs 3 secured to the axle and pivotally attached to the body. A carrying truck indicated generally at 4 has a forwardly extending reach 5 projecting beneath the body 2 and attached to said body by means of a circular member 6 fitting within a bearing opening 7 (see Fig. 4) in the bottom of the body and forming a fifth wheel which is pivotally connected to the reach 5 by means of a shaft 8 extending longitudinally of the reach. The body with its attached axle is thus permitted to turn about the vertical axis of the fifth wheel, and to so turn the body and axle and direct the movements of the vehicle, the fifth wheel is provided with a laterally extending arm 9 within the body and this arm is pivotally connected at its free end by a link 10 with a suitable traveling nut 11 mounted upon a screw shaft 12 and guided in its movement along said shaft by suitable guide bars 13 engaging grooves in the upper and lower sides of the nut. The guide bars are supported and held in spaced relation to guide the nut and prevent its turning, by means of brackets 14 and 15 secured in any suitable manner within the body 2. The bracket 14 carries suitable thrust bearings 16 to take the longitudinal thrust of the screw shaft and the opposite end of said shaft extends through the bearing 15 and is provided with a sprocket wheel 17 engaged by a sprocket chain 18 running over a like sprocket wheel secured to a stub shaft 19 mounted in a suitable bearing in a lateral extension of the bracket 15. A driving shaft 20 is mounted in a suitable bearing in longitudinal alinement with the stub shaft 19 and this driving shaft is actuated by a sprocket wheel 21 on its rear end engaged by a sprocket chain 22 running over a sprocket wheel 23 on the engine or other power shaft 24 arranged adjacent to the driving shaft 20. Keyed or otherwise secured to the forward end of the shaft 20, is a cup member 25 formed with two internal faces for the engagement therewith of cone members 26 and 27. The cup member 25 also forms a support for one end of a driven shaft 28 which is mounted in a suitable bearing plate 29 secured within the cup member. A thrust bearing 30 is interposed between the plate 29 and a head or nut 31 on the end of the shaft 28. The cup member 25 is secured to the shaft 20 and said shaft has a limited longitudinal movement in its bearing 32. To take the end thrust of the cup when it is moved rearwardly with its shaft, is a thrust bearing 33 interposed between the ends of said bearing and the hub of the cup. The cone member 27 has a tubular hub 34 through which the shaft 28 extends and which turns freely upon said shaft, and the cone member 26 has a hub which is rigidly secured to the shaft 28. A suitable gear casing 35 surrounds the shaft 28 and is rigidly supported by means of a bracket 36 with the sleeve 34 extending into the casing which contains a pair of gears 37 in mesh with the gear 38 secured upon the sleeve 34 of the cone member 27. A gear 39 similar to the gear 38 is sleeved upon an enlargement of the shaft 28 and connected thereto by suitable keys to turn therewith but permitting a free longitudinal movement of the shaft therethrough; and gears 40 within the casing in mesh with the gears 37 and the gear 39 cause a reversal of the direction of motion between the gears 38 and 39 so that when the cone member 27 is brought into contact with the cup 25 and is thus driven thereby, the shaft 28 will be turned in an opposite direction through the medium of the sleeve 34 and gears 38, 39 and 40.

A suitable coupling is provided between the forward end of the driven shaft 28 and the stub shaft 19 by providing a flange 41 on the stub shaft and an opposing coupling member 42 on the end of the shaft 28 operatively connected thereto to turn therewith but free to slide longitudinally thereof by means of keys 43 to engage key slots in the member 42. Pins 44 on the member 42 are adapted to engage suitable openings in the flange 41 and thus rigidly connect the movable coupling member to the stub shaft, and to prevent the longitudinal movement of the coupling member and the disengagement of its pins from the openings in the flange, a cap 45 of U-shape in side elevation and channel shape in cross section is provided to fit over the upper side of and embrace the flange 41 and a corresponding flange of the coupling member. A suitable locking pin 46 is provided to hold the cap in place.

The shaft 28 is formed with a screw-threaded section 47 between the casing 35 and the coupling 42, and on this screw-threaded portion of the shaft is a nut 48 having an ear for the pivotal attachment thereto of a downwardly extending arm 49 on a nut 50 having screwthreaded engagement with a screwthreaded steering post 51. The steering post is carried by a suitable support such as the dash board 52 and is free to turn and to swing upon its support by being provided with a grooved collar 53 carried by brackets on the dash board. A suitable hand wheel 55 is provided upon the upper end of the post by means of which it may be turned to actuate the nut 50.

It is to be noted that the driven shaft 28 has a slight free longitudinal movement which is sufficient to bring the cone 26 into driving engagement with the cup when said shaft is moved longitudinally in a rearward direction by the turning of the hand wheel 55 which will screw the nut 50 upon the steering post and, by reason of the pivotal connection of said nut with the nut 48 on the shaft, move said shaft longitudinally. When the cone is so moved into frictional contact with its cup, motion will be transmitted thereby from the driving shaft 20 to the shaft 28 in such a direction that the screw shaft 12 will be so turned that the nut 11 will be shifted in the proper direction to turn the body 2 relatively to the reach 5 in a direction corresponding to the direction in which the hand wheel 55 is turned. As soon as the cone is brought into frictional engagement with the cup and the shaft 28 is actuated thereby, such turning movement will tend to draw the cone out of engagement with the cup by reason of the screw-threaded engagement of the shaft 28 with the nut 48 connected to the nut 50 on the steering post, the direction of the screw threads on said shaft being such as to cause the longitudinal movement of the shaft through the nut in the proper direction. An opposite turning of the hand wheel 55 will actuate the nut 50 forwardly and thus move the shaft 28 longitudinally in a forward direction. This movement of the shaft will carry the cup 25 with it by reason of the nut 31 on the end of the shaft engaging the thrust bearing interposed between it and the bearing plate 29 carried by the cup. This forward movement of the cup brings it into frictional contact with the cone 27 and thus motion is transmitted from the driving shaft 20 by the cup to the cone and from the sleeve 34 of the cone to the shaft 28 by means of the gearing contained in the casing 35, a reversal of the direction of motion being secured by means of the gearing. Motion is thence transmitted as before, by the sprocket chain 18 to the screw shaft 12 to turn the same in a reverse direction and cause a movement of the nut 11 which will turn the body 2 in a direction corresponding to the direction in which the hand wheel 55 is turned.

In order to hold either of the cones in contact with its cup and cause a continued turning of the body to the limit of its movement, it is necessary to keep on turning the hand wheel in order to maintain the endwise pressure which the nut 47 is caused to exert on the shaft by the movement of the nut 50, for the moment said pressure on the shaft is relieved by the screwing of the shaft through the nut 48, the friction members will be separated and the transmission of motion from the shaft 20 will be stopped, leaving the front wheels of the vehicle in the position to which they have been turned by the travel of the nut 11 along the screw shaft.

Obviously changes may be made in the construction and arrangement of parts without departing from the spirit of the invention and I do not limit myself to the form or arrangement shown.

Having thus fully described my invention what I claim is:—

1. In a steering mechanism, a steering member, a driven shaft, means actuated by said driven shaft for imparting movement to said steering member, a driving shaft in longitudinal axial alinement with said driven shaft adapted to impart movement thereto, and means having a variable angular relation to said driven shaft adapted to move said shaft to control the operation of said driven shaft by said driving shaft.

2. In a steering mechanism, the combination of a power actuated driving shaft, means for transmitting motion in either direction from the driving to the driven shaft, manually operable means having a variable angular relation to said driven shaft and adapted for controlling said motion transmitting means to cause the same to transmit motion in the desired direction to the driven shaft, said means including a member to reciprocate said driven shaft by the turning of the driven shaft to stop the transmission of motion, a screw shaft actuated by the driven shaft, a nut on said screw shaft, and a steering member pivotally connected to said nut to be actuated thereby.

3. In a steering mechanism, the combination of a power actuated driving shaft, a driven shaft having a screw thread, means for transmitting motion in either direction from the driving to the driven shaft, a nut on the screwthreaded portion of the driven shaft adapted to be moved to move the shaft and control said motion trasmitting means, hand operable means having a variable angular relation to said driven shaft and adapted for moving the nut and shaft, and a steering member indirectly actuated by said driven shaft.

4. In a steering mechanism, the combination of a power actuated driving shaft, a driven shaft having a screw thread, means for transmitting motion in either direction from the driving to the driven shafts, manually operable means having a variable angular relation to said driven shaft including a nut on the screw threaded portion of said driven shaft for controlling the operation of said motion transmitting means to cause the same to transmit motion in either direction, which means is controlled in its operation by said nut, and a steering member indirectly actuated by said driven shaft.

5. In a steering mechanism, the combination of a motor driven driving shaft, a longitudinally movable driven shaft having a screwthreaded portion, means for transmitting motion in either direction from the driving shaft to the driven shaft, said means being actuated to transmit motion in the desired direction by a longitudinal motion of the driven shaft, a nut on the screwthreaded portion of the driven shaft, a hand steering member having a variable angular relation to said driven shaft, means for transmitting motion to the nut to move the driven shaft longitudinally, by a turning of the hand member, and a steering member indirectly actuated by said driven shaft.

6. In a steering mechanism, the combination of a motor driven driving shaft, a steering member, a driven shaft in longitudinal axial alinement therewith, means actuated by said driven shaft for imparting movement to said steering member, means for transmitting motion from the driving to the driven shaft including a pair of friction cones and a reversing mechanism actuated by one of said cones, and hand operable means for moving either of the cones into operative position and for moving said cones by the turning of the driven shaft.

7. In a steering mechanism, the combination of a motor actuated driving shaft, a driven shaft in axial alinement therewith having a screwthreaded portion, a steering member, means actuated by said driven shaft for imparting movement to said member, means for transmitting motion from the driving to the driven shaft comprising a pair of friction cones one of which is secured to the driven shaft, and motion reversing mechanism actuated by the other cone, a nut on the screwthreaded portion of the driven shaft, and hand operable means for holding the nut against turning and for moving the nut to move the shaft longitudinally and bring either one of the cones into operative position.

8. In a steering mechanism, the combination of a motor actuated driving shaft, a cup member secured to the end of the shaft to turn therewith and free to move longitudinally thereon, a driven shaft in longitudinal axial alinement with the driving shaft and cup member, a cone secured upon the driven shaft to engage the cup when the shaft is moved longitudinally in one direction, a cone mounted upon the driven shaft to turn freely thereon and to engage the cup member when said cup is moved into engagement therewith by a longitudinal movement of the driven shaft, a steering member, means for actuating said member from said driven shaft, reversing mechanism for transmitting motion to said driven shaft from the cone which is loose upon the shaft and hand operable means for moving the driven shaft longitudinally and adapted to cause said shaft to be automatically moved by a turning thereof.

9. In a steering mechanism, the combination of a motor actuated driving shaft, a driven shaft supported in longitudinal alinement therewith and having a screwthreaded portion, a cup secured to one end of the driving shaft to turn therewith and free to move longitudinally thereon and having connection with the driven shaft to be moved longitudinally by a longitudinal movement of said driven shaft, a cone fixed upon the driven shaft to engage the cup, a cone loose upon the driven shaft to engage the cup, a steering member, means actuated by said driven shaft to impart movement to said steering member, reversing gears actuated by the loose cone for transmitting motion therefrom to the driven shaft, a nut on the screwthreaded portion of the driven shaft, and hand operable means for holding the nut against turning and for moving the nut and shaft longitudinally.

10. In a steering mechanism, the combination of a motor actuated driving shaft, a driven shaft in longitudinal axial alinement therewith and having a screwthreaded portion, means for transmitting motion in either direction from the driving to the driven shaft including a pair of friction cones and reversing gearing actuated by one of the cones, said driven shaft being adapted to be moved longitudinally and having operative connection with one of said cones and said cup to move the same into operative engagement, a nut on the screwthreaded portion of the driven shaft, a steering post having a hand wheel and provided with a screw thread, a nut on the steering post operatively connected to the nut on the driven shaft, a steering member, and means for transmitting motion from the driven shaft to said member.

11. In a steering mechanism, the combination of a pivotally supported steering arm, a screw shaft, a nut on said shaft, guides for the nut, said nut and arm being operatively connected to turn the arm by a movement of the nut on the shaft, a motor actuated driving shaft, a driven shaft, means for transmitting motion from the driven shaft to the screw shaft, said driven shaft having a screw thread, means for transmitting motion in either direction from the driving to the driven shaft, said means being controlled in its operation by a longitudinal movement of the driven shaft, a nut on the screwthreaded portion of the driven shaft, and hand actuated means for moving said nut and shaft longitudinally to control the operation of the means for transmitting motion from the driving to the driven shaft.

12. In a steering mechanism, the combination of a fifth wheel, a laterally extending arm on said wheel, a casing within which the arm projects, a screw shaft mounted in bearings in the casing, guides adjacent to the screw shaft, a nut on the screw shaft engaging said guides and operatively connected to said steering arm, a cover member for the casing, a motor actuated driving shaft mounted in bearings on the cover, a driven shaft carried by the cover, a stub shaft mounted in a bearing on the casing in axial alinement with the driven shaft, means for transmitting motion from the stub shaft to the screw shaft, means for connecting and disconnecting the end of the driven shaft and the stub shaft, means for transmitting motion in either direction from the driving to the driven shaft, and manually operable means for controlling said means for transmitting motion from the driving to the driven shaft.

13. In a steering mechanism, the combination with a steering member, a driving shaft, and a driven shaft in alinement therewith, of means actuated by said driven shaft for moving said steering member, transmission means including cones between said driving and driven shafts, and manually operatable means having a variable angular relation to said driven shaft and adapted for controlling the operation of this transmission means.

14. In a steering mechanism, the combination with a steering member, of a driven shaft, means actuated thereby for moving said steering member, a driving shaft alining with said driven shaft and adapted to transmit movement to said driven shaft in either direction, and manually operatable means having an angular relation to both of said shafts for controlling the operation of said driven shaft.

15. In a steering mechanism, a steering member, a power driven shaft capable of rotative and reciprocable movement, means actuated by rotative movement of said shaft for imparting movement to said steering member, and means actuated by reciprocable movement of said shaft for controlling the operation thereof.

In testimony whereof I affix my signature in presence of two witnesses.

HENRY H. MARKER.

Witnesses:
 LEWIS E. FLANDERS,
 ANNA M. DORR.